United States Patent [19]

Sansone et al.

[11] Patent Number: 4,855,920

[45] Date of Patent: Aug. 8, 1989

[54] POSTAGE ACCOUNTING DEVICE

[75] Inventors: Ronald P. Sansone, Weston; Wojciech M. Chrosny, Milford, both of Conn.

[73] Assignee: Pitney Bowes, Inc., Stamford, Conn.

[21] Appl. No.: 813,443

[22] Filed: Dec. 26, 1985

[51] Int. Cl.[4] ............................................. G06F 15/20
[52] U.S. Cl. ........................... 364/464.02; 364/406; 364/466; 235/375; 235/382
[58] Field of Search ............... 364/464, 466, 900, 200, 364/470, 406, 409, 464.02; 235/433, 495, 432, 494, 468, 382, 375

[56] References Cited

U.S. PATENT DOCUMENTS

| 710,997 | 10/1902 | Pitney | 101/79 |
|---|---|---|---|
| 3,652,795 | 3/1972 | Wolf et al. | 379/94 |
| 3,832,946 | 9/1974 | Lupkas | 101/93 C |
| 3,869,986 | 3/1975 | Hubbard | 101/91 |
| 3,890,492 | 6/1975 | Manduley et al. | 364/466 |
| 3,938,095 | 2/1976 | Check et al. | 364/900 |
| 3,978,457 | 8/1976 | Check, Jr. et al. | 364/200 |
| 4,053,735 | 10/1977 | Foudos | 235/419 |
| 4,097,923 | 6/1978 | Eckert, Jr. et al. | 364/900 |
| 4,097,923 | 6/1978 | Eckert | 364/900 |
| 4,122,532 | 10/1978 | Dlugos | 364/900 |
| 4,168,533 | 9/1979 | Schwartz | 364/9000 |
| 4,226,360 | 10/1980 | Simjian | 235/375 |
| 4,231,511 | 11/1980 | Campanella et al. | 235/375 |
| 4,271,481 | 6/1981 | Check et al. | 364/900 |
| 4,286,325 | 8/1981 | Dlugos et al. | 364/466 |
| 4,302,810 | 11/1981 | Bouricius et al. | 380/24 |
| 4,319,328 | 3/1982 | Eggert | 364/464 |
| 4,335,434 | 6/1982 | Baumann et al. | 364/464 |
| 4,390,952 | 6/1983 | Dlugos | 364/464 |
| 4,393,454 | 7/1983 | Soderberg | 364/464 |
| 4,447,890 | 5/1984 | Dwuel et al. | 364/900 |
| 4,471,441 | 9/1984 | Check | 364/466 |
| 4,484,307 | 11/1984 | Quatse et al. | 364/900 |
| 4,499,545 | 2/1985 | Daniels et al. | 364/464 |
| 4,506,329 | 3/1985 | Duwel et al. | 364/900 |
| 4,506,330 | 12/1985 | Dlugos | 364/464.03 |
| 4,511,793 | 4/1985 | Racahelli | 364/466 |
| 4,511,793 | 4/1985 | Racanelli | 235/375 |
| 4,527,790 | 7/1985 | Piotroski | 364/478 |
| 4,536,850 | 8/1985 | Duwel | 364/464 |
| 4,574,352 | 3/1986 | Coppola et al. | 364/488 |
| 4,639,873 | 1/1987 | Bggarly et al. | 364/466 |
| 4,641,347 | 3/1987 | Clark et al. | 380/3 |
| 4,660,221 | 4/1987 | Dlugos | 380/23 |

FOREIGN PATENT DOCUMENTS

| 0099471 | 1/1984 | European Pat. Off. . |
|---|---|---|
| 0947991 | 1/1964 | United Kingdom . |
| 1508623 | 4/1978 | United Kingdom . |
| 1508623 | 4/1978 | United Kingdom . |
| 1581680 | 12/1980 | United Kingdom . |
| 1581680 | 12/1980 | United Kingdom . |
| 2048779 | 12/1980 | United Kingdom . |
| 2066736 | 7/1981 | United Kingdom . |
| 2132138 | 7/1984 | United Kingdom . |
| 2139147 | 11/1984 | United Kingdom . |
| 2174039 | 10/1986 | United Kingdom . |

*Primary Examiner*—Felix D. Gruber
*Assistant Examiner*—Ellis B. Ramirez
*Attorney, Agent, or Firm*—Donald P. Walker; Melvin J. Scolnick; David E. Pitchenik

[57] ABSTRACT

A device applicable for processing batch mail which eliminates the need for on-site inspection. A mail sender purchases postage value and stores the amount purchased in the memory of the accounting device. The mail sender processes batches of mail and reduces the amount of purchased postage value in the memory to account for the mail processed.

14 Claims, 6 Drawing Sheets

```
┌─────────────────────────────────────────────┐
│ ╬ PB  SERVER  NO. 7124   CUSTOMER  NAME     │
│                                             │
│   T.A. NO.      PIECE COUNT     REG. AM.    │
│   DATE          TIME            CLASS       │
│   BATCH NO.     RUN NO.         POST. TOTAL │
└─────────────────────────────────────────────┘
```

```
┌─────────────────────────────────────────────────┐
│                                  ┌─────────────┐│
│  ADDRESSOR                       │US POSTAGE   ││
│                                  │FIRST CLASS  ││
│                           43 ──  │ - PAID -    ││
│                                  │PB SERVER#7124││
│                                  └─────────────┘│
│                                                 │
│        22¢101885*C2J2743T56                     │
│        JOHN J. DOE                              │
│        TAIL SPIN ROAD                           │
│        WAXTON CT. 06999-1243                    │
│                                                 │
└─────────────────────────────────────────────────┘
```

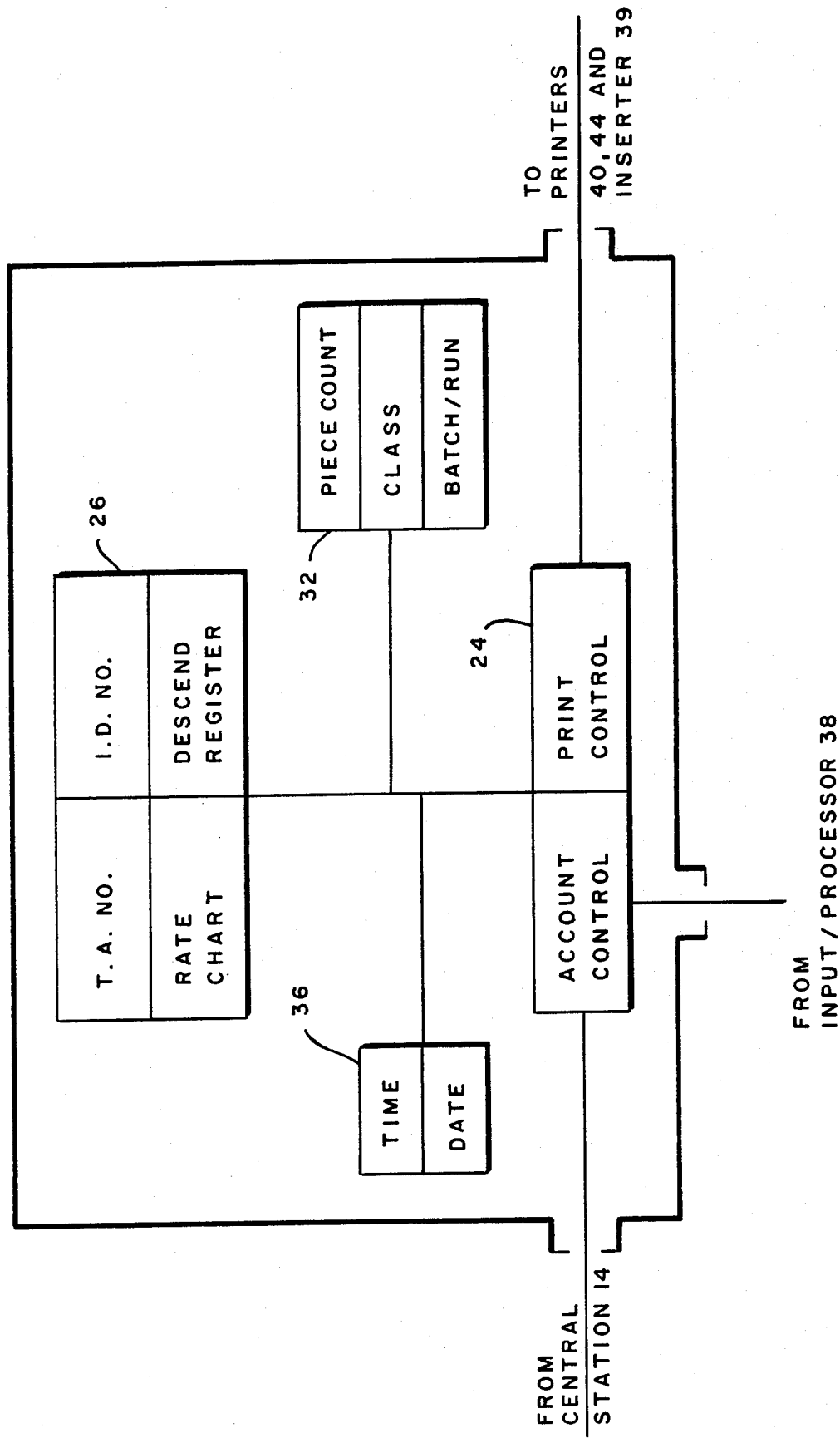

POSTAGE ACCOUNTING DEVICE

RELATED CASES

Subject matter similar to the subject matter contained in the instant application may be found in U.S. patent application entitled "BATCH MAILING SYSTEM" by Ronald Sansone et al and B-939 filed concurrently herewith and copending U.S. application Ser. No. 762,994 filed on Aug. 6, 1985 and entitled POSTAGE AND MAILING INFORMATION APPLYING SYSTEM. All of the above-identified applications are assigned to the assignee of the instant application.

BACKGROUND OF THE INVENTION

Certain organizations dispatch large amounts of mail usually on a periodic basis. Examples of such organizations are: banking institutions, utility companies, insurance companies, credit companies, and the like. With such large quantities, these mailers normally pre-package and pre-sort their mail and are given a lower postage rate by the postal service because of the time saved by the postal service. There are generally two ways that such mail senders can apply postage to their mail. The most common way is by the use of a postage meter that is leased by the mail sender from a postage meter manufacturer with which the amount of postage required is applied to each mail piece. Inserter systems have been developed whereby inserts may be placed into an envelope and the envelope may be sealed, addressed and have a postage indicia applied thereto. The mail pieces may either be weighed on the fly or individual weighing may not be required if all the mail pieces are of like kind, i.e., only a sample mail piece need be weighed. These acts of processing mail may be performed at a relatively high rate of speed.

A second method of mailing large quantities of mail pieces is the permit mail system. In such a system, the mail sender places a permit number on the mail pieces and prepares a manifest listing that shows the type and number of mail pieces being mailed on each ocasion and the postage required.

With both such systems, inspection at the site of the mail sender is required. In the case of the postage meter, the lessor of the postage meter, i.e., the postage meter manufacturer, is required by law to inspect the postage meter at least twice a year to ensure that there is no evidence of tampering with the postage meter that will indicate an attempt to obtain unauthorized postage. In the case of permit mail, large quantities of the same type of mail will be mailed at one time and the postal service will conduct an inspection to verify that the manifest listing accompanying the permit mail accurately accounts for the amount of postage due for the mail that has been processed by the postal service. This is accomplished through an inspection on the part the postal service by examining the records of the mail user on every occasion.

Obviously, each of these two systems has certain drawbacks. In the case of on-site inspection of postage meters, with the large number of postage meters in use by large mail senders it is an expensive matter for the inspection thereof. Furthermore, postage meters that process large quantities of mail must be replaced relatively frequently because of wear. With regard to the permit mail system, the shortcoming lies in the need of the postal service to send a representative frequently to the various mailer locations to ensure that the sender is accurately accounting for the quantity of mail being sent. Such a scheme is not totally reliable as it relies upon on-site verification using the mail senders records which are not secure.

SUMMARY AND OBJECTS OF THE INVENTION

A system has been conceived whereby a mail sender will be able to send large quantities, or batches, of mail without the need of on-site inspections. This is accomplished by the mail sender having a secure accounting unit similar to a postage meter in which postage value is placed by a dispensing or central station. A statement accompanies each batch of mail containing information relative to the mail and the amount of postage required. Communication between the central station and the mail sender allows postage value to be transferred to the mail sender by the central station and mailing and verification data to be sent to the central station from the mail sender. The mailing and verification data will be the same as that contained on the mailing statements that accompany the batches of mail. This system provides a central station for a large number of mail senders whereby the postal service is relieved of its obligation of having on-site inspections and the central station acts as a clearing house for the postal service through whom verification of postage can be conveniently and inexpensively achieved.

A further feature of this invention is that the security features of a postage meter are provided while allowing a high speed, relatively inexpensive printer to be used for printing the mail pieces.

BRIEF DESCRIPTION OF THE DRAWING

FIG. 2 is a plan view of an accounting statement that would accompany batch mail sent by the system of FIG. 1;

FIG. 3 is a plan view of an envelope containing information that would be applied thereto by the system of FIG. 1;

FIG. 4 is a block diagram showing the functional components of a postage accounting device and a central station.

DETAILED DESCRIPTION OF THE PREFERRED EMBODIMENT

Figure 1:
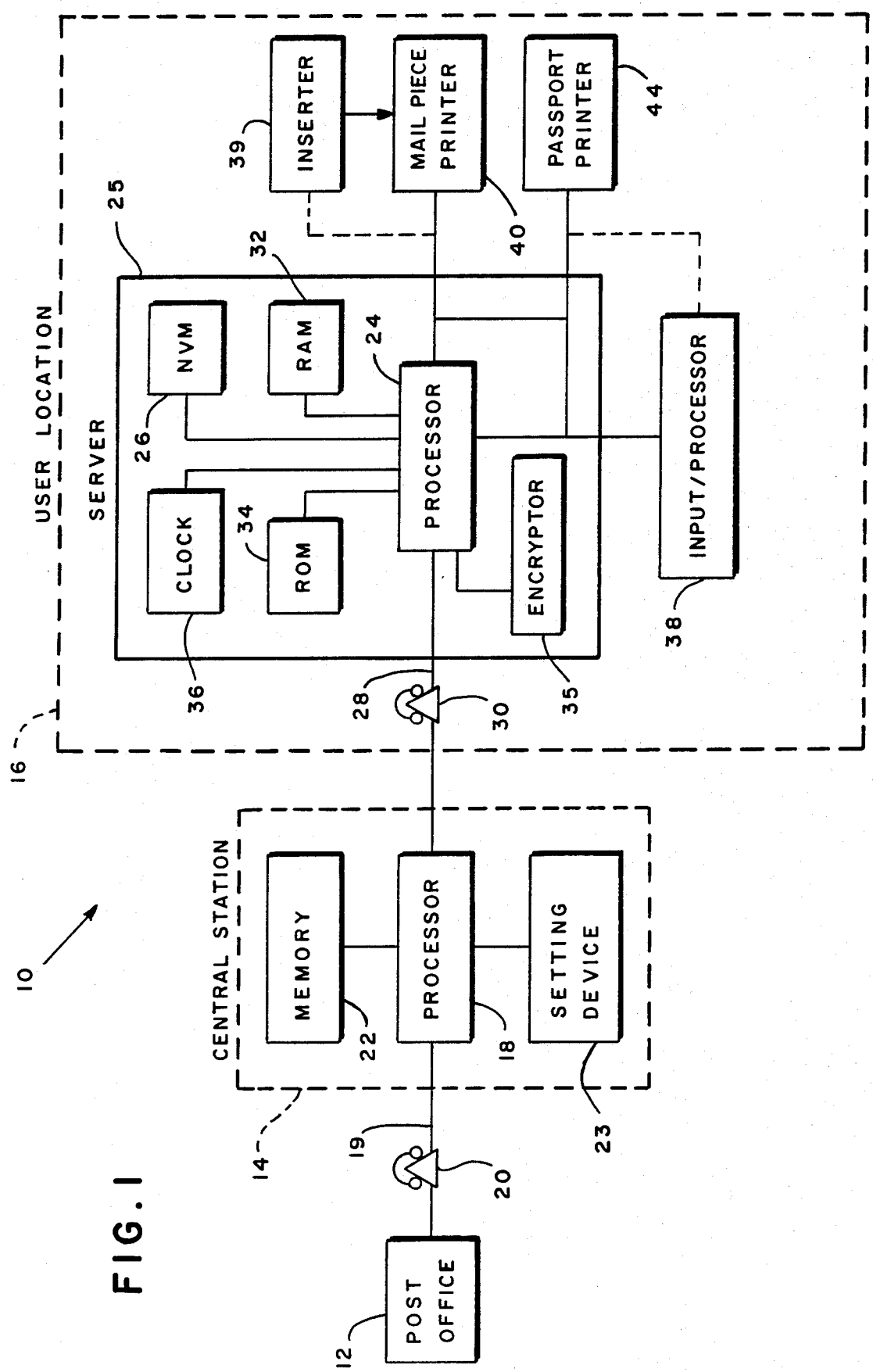
FIG. 1 is a block diagram of a batch mailing system which utilize the postage accounting device of the instant invention.
Figure 5:
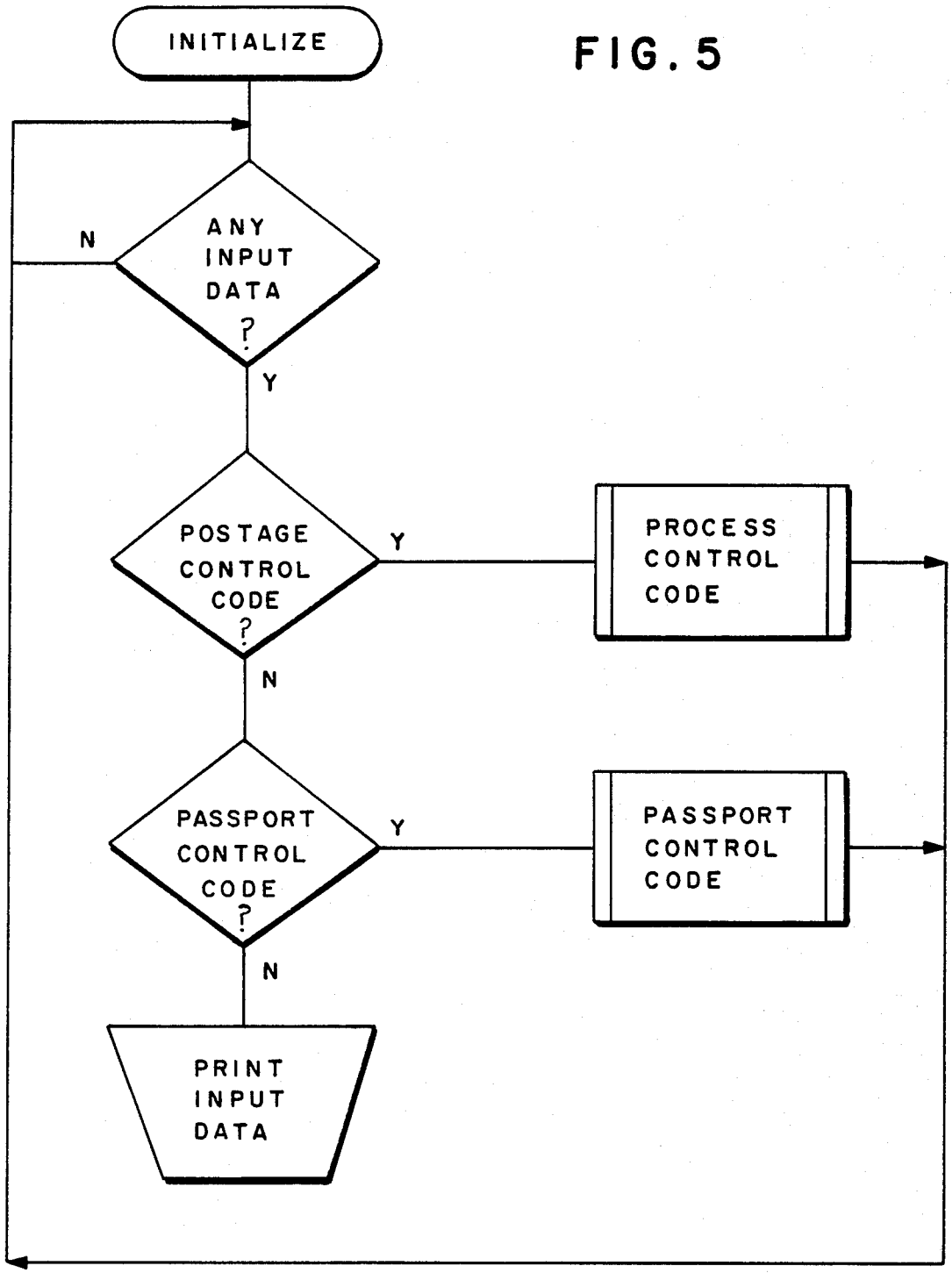
FIGS. 5–7 contain flow diagrams that describe the functions of the system shown in FIG. 1.
Figure 6:
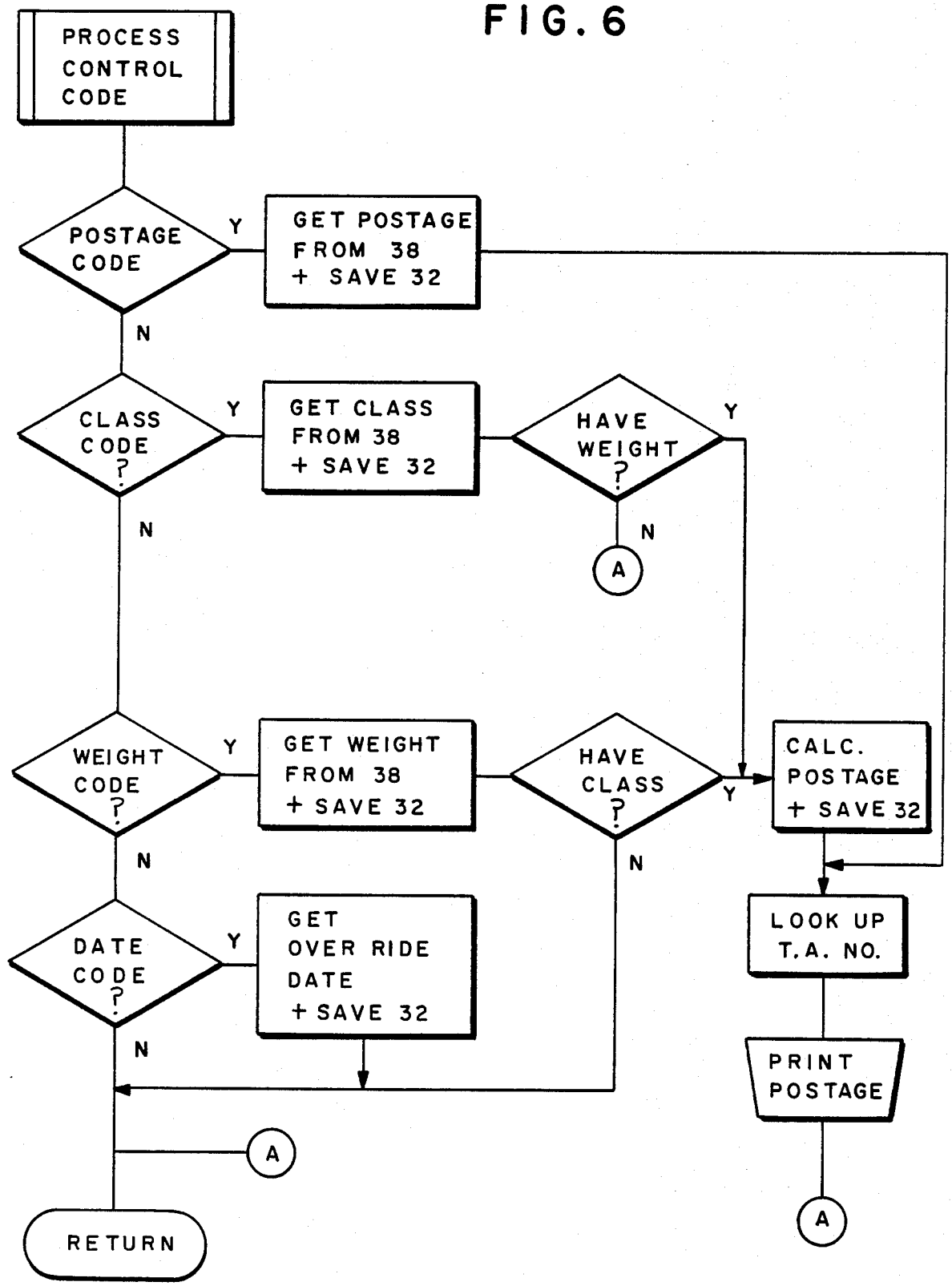
Figure 7:
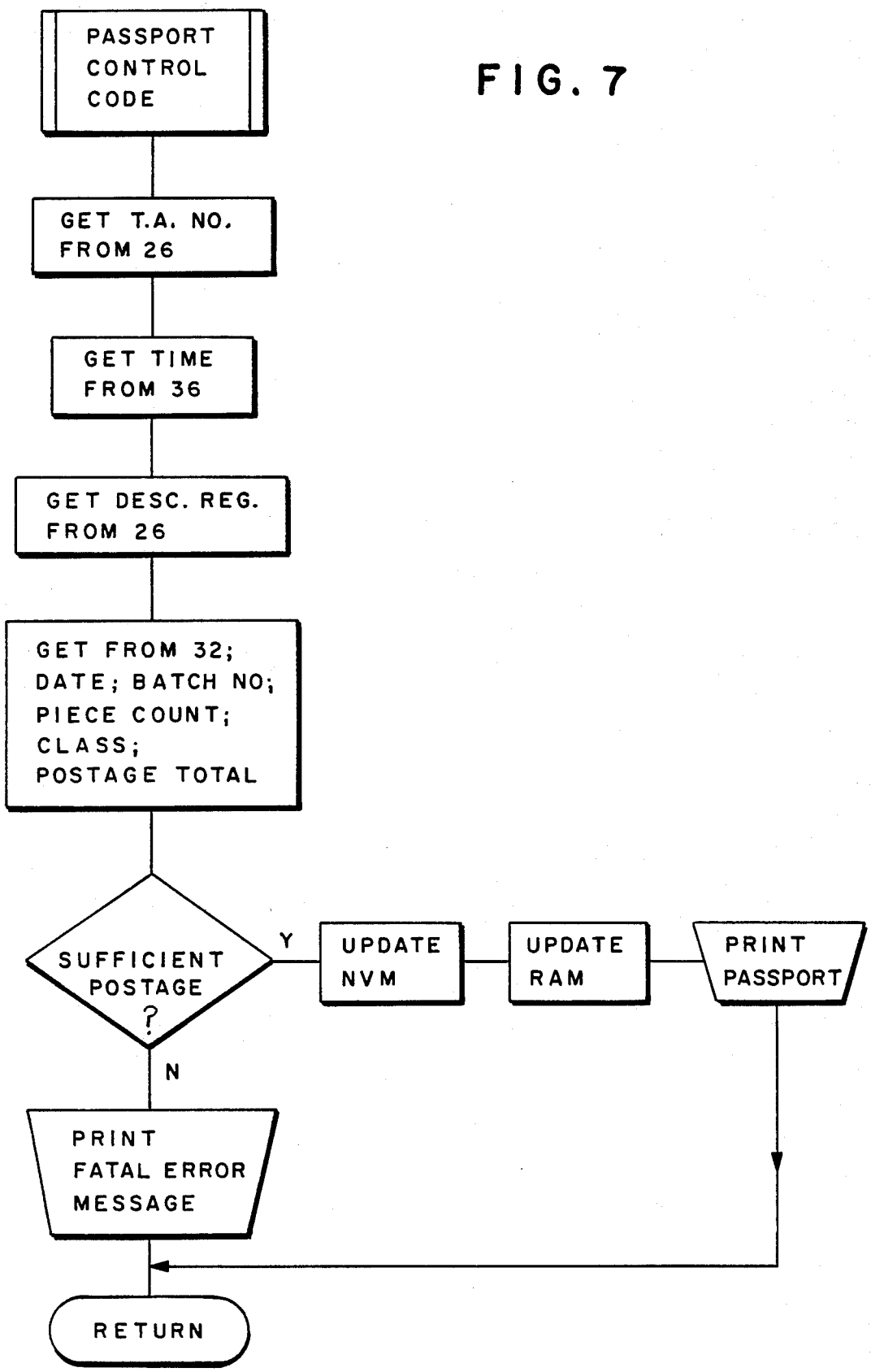

Referring now to FIG. 1, a batch mailing system that utilizes the instant invention is shown generally at 10 and includes a central station 14 and a user location 16. The central station 14 has a processor 18. This processor 18 could be a main frame type of computer having substantial capacity. Associated with the processor 18 and in connection therewith is a large storage memory unit 22 where large amounts of data can be stored and a register setting device 23 which includes encryption software of the type required in the resetting of postage meters remotely. Systems for the resetting of meters remotely are well known, see for example U.S. Pat. Nos. 3,792,446, 4,097,923 and 4,447,890.

A remote user location 16 has a secure postage accounting device 25 which will hereinafter be referred to as a "server". The server 25 is supplied by the control station 14 to the user and includes a user processor 24 which may be a processor of much smaller capacity, such as, for example, an Intel 8085 processor available from Intel Corporation, Santa Clara, Calif. Connected to the processor 24 is a memory 26. Preferably, the memory 26 will be a non-volatile memory (NVM). The user processor 24 is connected to the central station processor 18 through a communication link, or line, 28. A telephone 30, or other communicating device, may be disposed along the line 28 to thereby provide selective communication between a RAM 32, a ROM 34, an encryptor 35 and a clock 36 whose respective functions will be described in detail hereinafter. An input/processor 38 is connected to the user processor 24 whereby data may be supplied, either manually or through a medium such as a disc or tape, to the user processor for the purpose of providing data required in the processing of mail pieces. The input/processor 38 may be any of a large number of personal computers having keyboard and display which are commercially available, such as an, for example, IBM XT personal computer.

A high speed inserter 39 is in electrical communication with the server 25 and performs the physical acts involved in processing the mail such as the inserting of inserts into envelopes, sealing the envelope flaps, orienting the mail pieces and conveying the mail pieces to a postage meter or printer. The term "insert" includes bills, advertising materials, notices and the like which are of a size to be received within an envelope or the like. High speed inserters of this type are readily available commercially, as for example Inserter Model No. 3100 series from Pitney Bowes Inc., Stamford, Ct.

A first printer 40 is in communication with the user processor 24 of the server 25 and with the input/processor 38 and is able to print upon mail pieces 42 such as envelopes containing inserts which it receives from the inserter 39. This printer 40 is one provided by the user and will generally be an unsecured, high speed printer that may be controlled either through the processor 24 or through the input/processor 38. A second printer 44 is provided to print upon a statement sheet 46 or other document. This second printer 44 is, preferably, a secure printer that is provided by the central station 14. By "secured" is meant a device constructed in the same manner as a postage meter without access to the interiors thereof except by authorized personnel. An example of such a postage meter is a Model 6500 postage meter available from Pitney Bowes Inc., supra. Obviously, the second printer 44 can be an unsecured printer but this occasions greater risk in terms of verifying payment of mail. Throughout the balance of the specification and claims this statement sheet 46 will be referred to as a "passport". Details of the passport 46 will be described hereinafter in conjunction with FIG. 2.

Although only one user location 16 is shown and described, it will be appreciated that many user stations can be serviced by the central station 14 as, for example, through multiplexing. The central station 14 may be the location of a postage meter manufacturer or other accountable organization.

In operation, the user location 16 at the user will be a processor of large quantities of mail who will be given an identification number by the central station 14 that will be placed in the NVM 26 of the server 25. Preferably, this identification number will be permanent and unique for each server 25 and the user will have no access to that portion of the NVM 26 that stores the identification number. It will be appreciated that this feature may be applied to postage meters as well. Having the identification number in memory 26 eliminates the need of having a plate applied to a postage meter or a server 25. It will be appreciated that a server 25 has many characteristics of a postage meter, i.e., security, a descending register and the like, but certain elements are absent. The most evident absent element is a printer, the advantage of which is described throughout. Another absent member is an ascending register. In a postage meter an ascending register is ascessable only by a service representative of the meter manufacturer and may be used to determine if any meter tampering has taken place. As will be appreciated from the description that follows, the need for an ascending register in the server 25 is obviated. Following installation of the identification number, the user will communicate with the central station 14 through the telephone 30 for the purpose of indicating to the central station 14 the amount of postage value it wishes to have accredited to its memory 26. An access code will be given to the user that can be addressed to the setting device 23 through the touch dial of the telephone 30. Upon the receipt of the access code, the user will transmit to the central station 14 the access code and his identification number and the request for an amount of postage value. The setting device 23 will function to fund, or increase, the postage value in the memory 26. This memory 26 will include a descending register which is charged by the central station 14 with the selected amount of postage value. As the user location 16 processes mail, the postage value in the descending register will be decreased in accordance with the postage required to process the mail pieces. Devices for charging registers such as the descending registers are well known, as for example see U.S. Pat. Nos. 3,792,446, 4,097,923 and 4,447,890.

The balance of the server 25 includes the ROM 34 that contains information which formats address signals and stores a series of programs for controlling the functions of the server 25, the RAM 32 that will hold and supply real time data, the clock 36 that will provide the time and date and an encryptor 35 that will store the code required for the descending register setting functions. The encryptor 35 can be any one of a number of encrypting devices including devices which use the Data Encryption Standards described in FIPS P4B 46, dated Jan. 15, 1977 and published by the U.S. Department of Commerce, National Bureau of Standards.

Referring now to FIG. 4 a functional description of the server 25 will be given. It will be noted that major modules shown in FIG. 1 are separated functionally in FIG. 4 for the purposes of description. The user processor 24 serves, inter alia, two control functions. One of these two control functions is to act as an account controller by interfacing with the processor 18, the non-volatile memory 26 and the input/processor 38. As more fully discussed below the other of the two control functions is to act as a print controller. Postage value will be initially received from the setting device 23 at the central station 14 and stored in the descending register portion of the NVM 26. Also stored in the memory 26 is the transaction number, and identification or serial number of the server 25. Within the memory 26 may be stored information relative to the postage rate which is referred to as a rate chart. With such a rate chart, one would be able to determine the postage required for different classes and weights of mail. For example, if a mail piece is to be sent first class, one postage would be required; whereas, if mail is to be sent airmail, another postage is required. Alternatively, if mail is to be sent by air domestically it would have a given rate; whereas, if mail were to be sent abroad it would be given a different rate depending on whether it is going by ship or by air. The rate chart within the memory 26 would send data to the account control function in response to information supplied by the input processor 38. When a run of mail is to be made the input/processor 38 will supply to the server 25 the number of mail pieces, the class, batch number and run. All this data will be stored in the RAM 32 in real time. This data from the NVM 26 RAM 32, and clock 36 would then be utilized by the processor 24 to determine the postage amount for the mail being processed which would be supplied by the print control function of the processor 24. The same would cause the printing of the appropriate information upon a mail piece 42 as shown in FIG. 3.

It will be appreciated that the printer 40 is a high speed, unsecured printer such as a ink jet printer or laser printer which, in one embodiment, will apply the addresses of the addressee and addressor to the face of the mail pieces under command of the input/processor 38. In addition, other information can be printed by the printer 40 upon each mail piece 42 when under command of the processor 24. This information includes a transaction number (T.A. No.), the run of the particular batch of mail, the date and time of mailing, the class of mail and a batch number. The transaction number is that number assigned to the user location 16 by the central station 14 every time postage value is added to the server 25 thereof and will be stored in the NVM 26. This transaction number will be the same for one or more batches of mail that are sent and will remain the same until such time as the descending register of the NVM 26 is recharged with postage value, at which time a new transaction number will be assigned and stored in the NVM 26 in place of the preceding transaction number. By changing the transaction number at each recharge, an element is provided for verifying postage. The batch number is assigned by the user through the input/processor 38 whereby a given batch of mail, i.e., mail of a particular type or character, will be identified by a number assigned by the user. In addition, a run number, which can be a subset of the batch, may be given to identified particular segments of the batch.

When a batch of mail is to be sent, the user will supply mailing and verification information through the input/processor 38 into the user processor 24 which will transmit at least a portion of this information to the inserter 39. This information would generally include such things as the number of mail pieces to be processed and number of inserts to be placed in each envelope. The time and date may be supplied to the printer 40 through the input/processor 38 by overriding the clock 36. This overriding is useful when future mail is being processed. The user processor 24 will then command the printer 40 to print the appropriate postage, time, date, transaction number and address on the mail pieces for a particular run. This run will be a given a number that is associated with the particular mail to be sent, which number will be printed on the envelopes 42 of that run. As the printer prints the appropriate information upon each mail piece, the number of mail pieces and amount of postage required will be determined by the processor 24. At the end of the run or batch, the second printer 44 will print authorization information upon a passport 46.

Referring now to FIG. 2, the passport 46 is shown after having printed thereon the total postage (Post. Total) required to mail the batch of mail, the transaction number (T.A. No.), piece count for a batch, descending register amount (Reg. Am.) after subtraction for the postage, the date, the time, the class, the batch number and the run (optional). Additionally, the server number (identification number stored in the NVM 26), user name and any desired graphics can be printed. This information on the passport 46 can serve many purposes. Firstly, the register amount acts as a physical record of the postage value stored in the descending register of the NVM 26. This amount is, preferably, printed in the passport 46 on the upper right hand portion thereof. The register amount will be that amount in the descending register after all postal charges have been made for the batch of mail to be sent. By placing this register amount on the passport 46 after the mailing of each batch, an ongoing, permanent record is maintained of the amount of postage value contained within the NVM 26. In this way, if there is a disaster wherein, for example, the server 25 is destroyed or the memory 26 therein is erased inadvertently, the user will still have a means for verifying the amount of postage value remaining from that amount of postage value originally purchased and stored. The transaction number provides an authorization check as does the identification or server number. By changing the transaction number with each recharge of the server, one can readily determine if more postage accompanies a transaction number than is authorized. Also printed on the passport 46 will be the date and time the passport 46 is printed, the piece count, i.e., the number of mail pieces mailed in the particular batch, and the class of mail. Upon the printing of the information on the passport 46, the postage amount for the batch will be subtracted from postage value stored in the descending register of the NVM 26.

The information printed upon the passport 46 is transmitted to the central station 14 through the communication line 28 automatically after each batch, is processed so that a record is maintained through the processor 18 that communicates with memory 22. The memory 22 has an ascending register therein that corresponds to the descending register in the server 16, i.e., one is the inverse of the other. As is known, an ascending register is one that accumulates charges over a long term. Optionally, the memory 22 may have a descending register that duplicates the amounts in the descending register in the NVM 26 on an ongoing basis. By having the postage value contained within the memory 22 that corresponds to the value of the server 25, a check is constantly made to ensure that there is a correspondence between the passport 46 information and the amount of postage paid by the user. More specifically, the total amount credited to the user location 16 will be stored in memory 22 and if the amount in the ascending register exceeds that total amount available to the user, the user location 16 will be notified that there are insufficient funds. When a batch of mail is sent to a post office for processing, the passport 46 for that particular batch will accompany the mail. The postal employee can determine whether it is an authorized transmission of mail from the information contained upon the accompanying passport 46. If there is any question on the part of the postal service as to whether the information is authentic, it will contact the central station 14 and through the line 19 to obtain the information from the central station to verify the information contained on the passport 46. If this information is accurate, then the postal service will know that the mail is authorized, i.e., the postage for the mail has been paid. On the other hand, if there is any discrepancy, the postal service is able to act to ferret any fraud or correct any discrepancy. As is the usual practice in the use of postage meters, a user location 16 will send all its mail to an assigned post office.

Referring now to FIG. 3, an envelope 42 is shown as it would be prepared by the present system 10. The upper left hand corner is the address of the mail sender and the upper right hand corner contains a pre-printed block that states the class of mail and gives the identification or server number of the mail sender. This information may be preprinted on the envelopes 42 prior to the processing of a batch. Such preprinting may be accomplished through direct communication of the input/processor 38 with the printer 44 without any participation of the other components of the user location 16.

In the processing of batch mail, the three address lines will first be printed with the name of the recipient, the street address and the city, state, zip code. The fourth line, or postage line, is then printed using information supplied by the processor 24. This postage line includes the postage amount $.22, the date, Oct. 8, 1985 and the transaction number, which in this case is C2J2743T56. Other or different information may be given on this postage line if so desired including the time the mail is processed. Although the postage line is shown in alpha-numerics it will be appreciated that the same maybe printed in bar code and, optionally, bar code address information may be printed on the envelope as desired.

Although the envelope 42 shown has the information printed on the face thereof the same scheme will apply to a windowed envelope. In a windowed envelope it may be preprinted as previously described but instead of the printer 40 printing on the face of the envelope 42 an insert would be printed with the same information shown on the face of the envelope 42 and inserted so as to be viewed from the window.

In this way what is provided is a method of allowing an organization to send large amounts of mail without having to frank every piece. In addition, the postal service is saved the problem of requiring on-site inspections at the user location 16 in order to verify that no unauthorized mail is being sent. By correlating the amount of postage, the transaction number, piece count, registration amount and the like, verification can be made without the need of encryption. The central station 14 more or less acts as a bank representing the postal service and handles the funds on its behalf as well as maintains records for verification. The funds or postage value charged to the server 25 may be either prepaid or charged to the user by the central station 14 on a credit arrangement. The central station 14 would be accountable to the postal service for the postage value placed in the server 25 on a immediate basis.

Another advantage of this system is that the printer 40 that prints the large numbers of mail pieces is not part of a secure member, i.e., the server 25, as in the case of a postage meter. Because of this, the printer may be replaced frequently without the expense or inconvenience of entire replacement. It will be appreciated that one printer may be used in place of the two printers 40, 44 shown and described, but the preferred embodiment contemplates the use of two printers for the reasons given.

What is claimed is:

1. A postage accounting device adapted to be connected to a printing device for printing postage data, said accounting device comprising: a secured accounting unit including a processor and a memory in communication with said processor, said memory including a rate chart of postage rates for different classes of mail, said accounting unit comprising means for inputting data identifying a class of mail, said secure accounting unit comprising means responsive to said class identification data and said rate chart for compiling postage data such that said secure accounting unit accounts for postage required to process a batch of mail.

2. The device of claim 1 further comprising means for providing a command to cause the printing of postage information of each mail piece.

3. The device of claim 1 wherein said memory has a descending register for storing postage value.

4. The device of claim 3 wherein said memory is non-volatile and contains an identification number.

5. The device of claim 3 including postage value setting means in selective communication with said processor for adjusting the postage value amount in said descending register.

6. The device of claim 1 further comprising means for providing a command after said batch is processed to enable the printing of information relating to said batch.

7. The device of claim 6 wherein a descending register value is stored in said memory and said device further comprises means for outputting said descending register value.

8. The device of claim 7 wherein said commands occur periodically.

9. The device of claim 8 wherein said command is generated when said information relating to said batch is to be printed.

10. A postage accounting device comprising:
   (a) a processor;
   (b) means for inputting postage information to said processor including information identifying a class of mail;
   (c) a memory in communication with said processor, said memory including rate chart means;
   (d) security means for providing security for said processor and said memory;
   (e) means for inputting postage value into said memory;
   (f) means, in communication with said processor and responsive to said mail class information and said rate chart means for determining the amount of postage required to process mail pieces in a batch of mail pieces; and,
   (g) means, in communication with said processor, for subtracting a series of such amounts from said postage value stored in said memory to account for said batch of mail pieces.

11. The device of claim 10 wherein said memory is non-volatile and has an identification number stored therein.

12. A postage accounting device comprising:
   (a) a processor;
   (b) means for inputting information relative to a batch of mail pieces to said processor, including information identifying a class of mail;
   (c) means, including rate chart means, in communication with said processor, for determining the amount of postage required to process said batch of mail pieces, said determining means being responsive to said mail class information and said rate chart means for determining said amount of postage; and, (d) means, in communication with said processor, for outputting a determination of postage required to process said batch of mail pieces.

13. A postage accounting device comprising:
(a) a processor;
(b) means for inputting postage information to said processor including information identifying a class of mail;
(c) a memory, including rate chart means, in communication with said processor;
(d) means for inputting postage value into said memory
(e) means, in communication with said processor, for determining the number of mail pieces in a batch of mail pieces;
(f) means, in communication with said processor, for determining the amount of postage required to process said batch of mail pieces, said postage determining means comprising means responsive to said class identification information and said rate chart means for determining said amount of postage;
(g) means, in communication with said processor, for subtracting said determined amount from said postage value stored in said memory; and
(h) means, in communication with said determining means, for outputting the amount of postage required to process said batch of mail pieces.

14. In a method of accounting for postage required to send mail pieces, the steps comprising:
(a) supplying, from a central station, postage value to a descending register of a memory;
(b) counting the number of mail pieces to be sent and inputting mail class information;
(c) determining the amount of postage required to mail said mail pieces, said determining step including the step of accessing rate chart means to determine said amount of postage corresponding to said mail class information;
(d) subtracting the postage amount from said postage value in said descending register; and,
(e) selectively communicating said postage amount and said number of mail pieces to said central station.

* * * * *